United States Patent
Katahira (10) Patent No.: US 9,106,772 B2
(45) Date of Patent: Aug. 11, 2015

(54) IMAGE PROCESSING APPARATUS AND METHOD OF CONTROLLING THE SAME

(71) Applicant: CANON KABUSHIKI KAISHA, Tokyo (JP)

(72) Inventor: Yoshiaki Katahira, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 175 days.

(21) Appl. No.: 13/722,758

(22) Filed: Dec. 20, 2012

(65) Prior Publication Data

US 2013/0188216 A1     Jul. 25, 2013

(30) Foreign Application Priority Data

Jan. 19, 2012   (JP) .................................. 2012-009427

(51) Int. Cl.
*H04N 1/00* (2006.01)
*H04W 76/02* (2009.01)

(52) U.S. Cl.
CPC ......... *H04N 1/0001* (2013.01); *H04N 1/00037* (2013.01); *H04N 1/00076* (2013.01); *H04W 76/027* (2013.01); *H04N 1/00217* (2013.01); *H04N 2201/0039* (2013.01); *H04N 2201/0049* (2013.01); *H04N 2201/0055* (2013.01); *H04N 2201/0094* (2013.01); *H04N 2201/0098* (2013.01)

(58) Field of Classification Search
USPC .............. 370/242, 245, 248, 252, 255, 395.2, 370/463
See application file for complete search history.

(56) References Cited

U.S. PATENT DOCUMENTS

| | | | |
|---|---|---|---|
| 7,752,498 B2 * | 7/2010 | Yabuki | 714/24 |
| 2003/0214678 A1 | 11/2003 | Shibata et al. | |
| 2005/0099962 A1 * | 5/2005 | Matsuda | 370/254 |
| 2005/0272420 A1 * | 12/2005 | Matsuda et al. | 455/426.2 |
| 2008/0252919 A1 | 10/2008 | Okayama et al. | 358/1.15 |
| 2008/0297828 A1 | 12/2008 | Niikura et al. | 358/1.15 |
| 2009/0116054 A1 * | 5/2009 | Mitsudomi | 358/1.15 |
| 2009/0310594 A1 * | 12/2009 | Nakata | 370/350 |
| 2011/0200025 A1 * | 8/2011 | Goto | 370/338 |
| 2012/0026556 A1 | 2/2012 | Katahira | 358/442 |
| 2012/0278654 A1 * | 11/2012 | Shen et al. | 714/23 |
| 2013/0294244 A1 * | 11/2013 | Fujita et al. | 370/235 |

FOREIGN PATENT DOCUMENTS

| | | |
|---|---|---|
| JP | 2003-333271 A | 11/2003 |
| JP | 2007-288550 A | 11/2007 |

\* cited by examiner

*Primary Examiner* — Benjamin H Elliott, IV
(74) *Attorney, Agent, or Firm* — Fitzpatrick, Cella, Harper & Scinto (57) ABSTRACT

When an error occurs in communication between an access point and an image processing apparatus, it is determined whether a setting of the access point has been changed. When an error occurs in communication between the access point and the image processing apparatus, the error is notified to a user. If it is determined that the setting of the access point has been changed, resetting of a wireless LAN by a user is awaited, and then, connection between the access point and the image processing apparatus is started.

9 Claims, 8 Drawing Sheets

IMAGE PROCESSING APPARATUS AND METHOD OF CONTROLLING THE SAME

BACKGROUND OF THE INVENTION

1. Field of the Invention

The present invention relates to an image processing apparatus and a method of controlling the apparatus.

2. Description of the Related Art

Wireless LAN techniques, such as IEEE 802.11b/11g/11n, have been adopted by various products, and become very familiar to most users. Because the wireless LAN techniques realize wireless connection between apparatuses that have conventionally been connected by wires, and set users free from problems such as limited installation places of apparatuses or complicatedly tangled cables, the techniques are extremely useful and convenient. Because of these advantages, many homes and offices have wireless LAN access points, and are increasingly constructing wireless LAN environments with a plurality of wireless-LAN-incorporated products and their access points.

In a wireless LAN access point, it is possible to set security for protecting communication and a unique ID called SSID for identifying the access point. These must be set by a user in advance. In wireless LAN environment, even though a wireless LAN connection is established once, wireless LAN connection errors occur when an access point setting is changed or when the wireless LAN communication state worsens. Japanese Patent Laid-Open No. 2007-288550 discloses automatic changing of communication speed at an access point when a wireless LAN connection error is caused by a worsened wireless LAN communication state. In addition, Japanese Patent Laid-Open No. 2003-333271 discloses setting the most appropriate waiting time for determination of a communication time-out error.

When a setting of a wireless LAN's access point is changed, a connection error occurs in the products that are connected to the access point through the wireless LAN. The error includes, for instance, an error caused by different security setting, an error caused by different encoding systems, an error caused by incorrect setting of WPA/WPA2 PSK, authentication failure of a shared key, failure of open authentication, and so forth. When such an error occurs, a user needs to perform wireless LAN setting on the product side that is connected through the wireless LAN. However, if a user tries to utilize, for instance, the electronic mail transmission function or print function through the wireless LAN transmission/reception function without knowing that there is a connection error, the user falls into a state in which these functions are not available.

Furthermore, when a transmission error is caused by a connection error in the transmission function, transmission retries are performed until time-out is reached. However, the connection error cannot be overcome unless a wireless LAN setting is changed; therefore, such transmission retries are pointless. Moreover, when the transmission retries fail, the transmission data is discarded. Therefore, even if the connection error is overcome, the transmission data does not reach the destination, and this causes poor usability.

Furthermore, the transmission retries performed because of a transmission error in the transmission function do not take a worsened wireless LAN communication state into consideration. Therefore, the timing of transmission retries is not appropriate.

SUMMARY OF THE INVENTION

An aspect of the present invention is to eliminate the above-mentioned problems which are found in the conventional technology.

A feature of the present invention is to provide a technique that enables notification of a wireless LAN connection error to a user, and that does not execute transmission retries in a case of an error that cannot be overcome unless a wireless LAN setting is changed.

According to an aspect of the present invention, there is provided an image processing apparatus capable of wireless communication to an access point, comprising: a determination unit configured to determine, when an error occurs in communication to the access point, whether a setting of the access point has been changed; a notification unit configured to notify a user of an error when an error occurs in communication to the access point; and a wireless connection unit configured to, in a case where the determination unit determines that the setting of the access point has been changed, start connection to the access point after resetting of the wireless communication is performed by the user.

Further features and aspects of the present invention will become apparent from the following description of exemplary embodiments, with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

DESCRIPTION OF THE EMBODIMENTS

Embodiments of the present invention will be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention.

Figure 1:
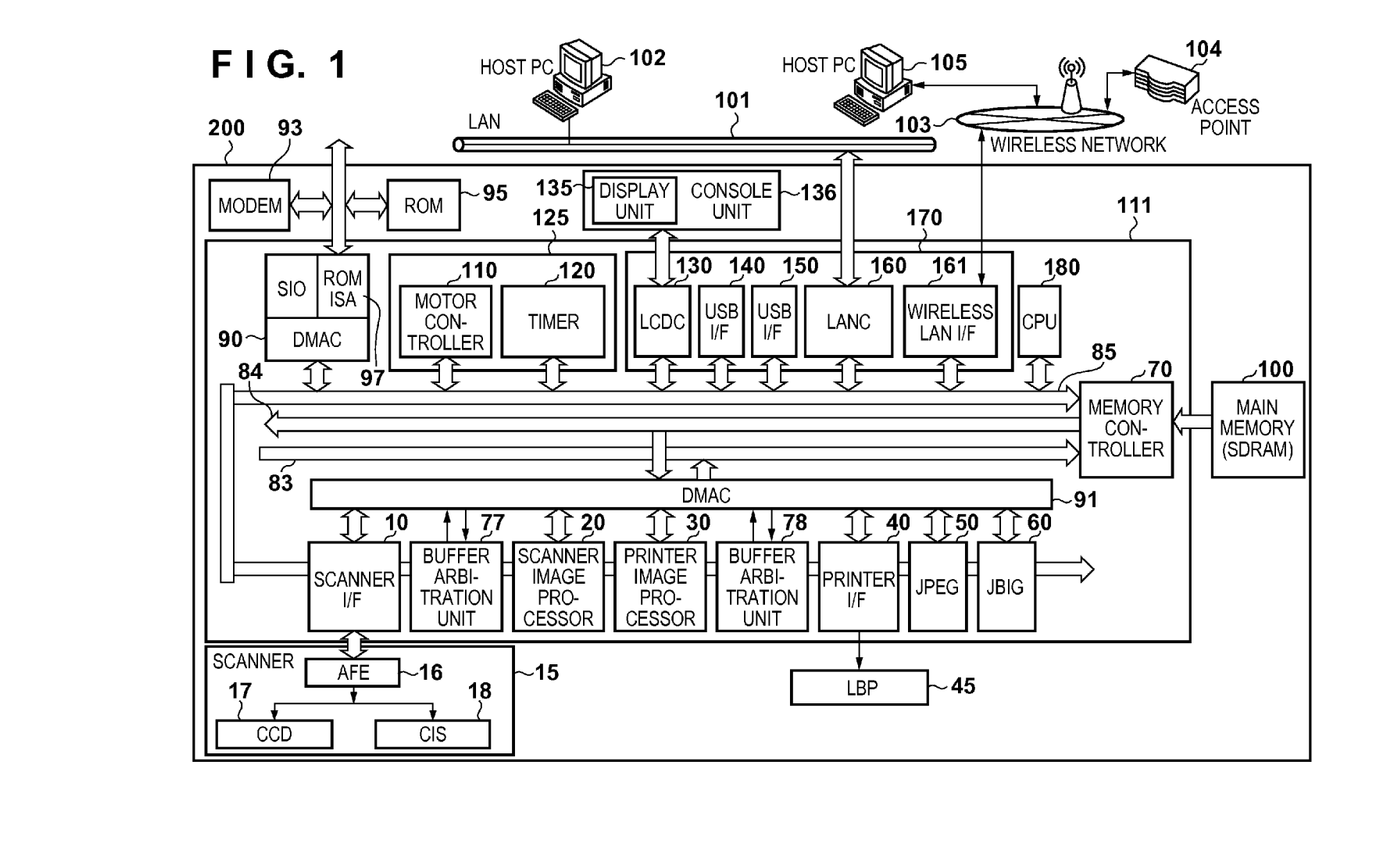
FIG. 1 is a block diagram of a system mainly showing a hardware configuration of an image processing apparatus (multi-function processing apparatus) according to an embodiment of the present invention.

FIG. 1 is a block diagram of a system mainly showing a hardware configuration of an image processing apparatus (multi-function processing apparatus) 200 according to an embodiment of the present invention.

To a scanner interface (scanner I/F) unit 10, a scanner unit 15 serving as an image input device is connected. The scanner I/F unit 10 can capture image data, which is obtained by reading an image by a CCD 17 or CIS (contact image sensor) 18, in the image processing apparatus 200 through an analog front end (AFE) 16. The scanner I/F unit 10 can also capture an output of a document detection sensor from an auto document feeder (ADF) (not shown) of the scanner unit 15 to supply it to a control unit 111 of the image processing apparatus 200. Data processing of the scanner I/F unit 10 will be described later in detail.

A scanner image processor 20 performs image processing on image data, which has been loaded into a main memory 100 by processing of the scanner I/F unit 10, in accordance with an image processing operation mode (e.g., color copying, monochrome copying, color scanning, monochrome scanning or the like). A buffer arbitration unit 77 arbitrates data writing and reading in a case where data transmission between the scanner I/F unit 10 and the scanner image processor 20 is performed through a ring buffer area of the main memory 100.

A printer image processor 30 performs area editing or resolution conversion or the like on input image data, and outputs the obtained image data to a laser beam printer (LBP) 45. A printer I/F 40 outputs the image data, obtained as a result of processing by the printer image processor 30, to the laser beam printer (LBP) 45. A buffer arbitration unit 78 arbitrates data writing and reading in a case where data transmission between the printer image processor 30 and the printer I/F 40 is performed through a ring buffer area of the main memory 100. A JPEG module 50 and a JBIG module 60 perform image data compression or decompression according to the respective standards.

A memory controller 70 connects a first bus 83 and a second bus 84 of the image processing apparatus and a third bus 85 of the computer system, and performs control for data writing or reading in the main memory 100. A DMA controller (DMAC) 90 is connected to a ROM 95 through a ROMISA 97, generates and sets address information for controlling DMA transfer between the main memory 100 and an external device or various interface units 170 in cooperation with the memory controller 70.

A DMA controller (DMAC) 91 generates and sets address information for controlling DMA transfer between the main memory 100 and various interface units (10, 40) or image processors (20, 30) in cooperation with the memory controller 70. For example, in accordance with the type of image-reading device or the use of the CCD 17 or CIS 18, address information for DMA-transferring the image data, which has been read-processed by the scanner I/F unit 10, to the main memory 100 is generated for each DMA channel. Alternatively, address information for reading image data, which has been loaded into the main memory 100, is generated in accordance with a DMA channel. In this manner, the DMAC 91 serves as a unit for executing DMA control between the main memory 100 and the various interface units (10, 40) or the image processors (20, 30). The scanner I/F unit 10 is adaptable to the CCD 17 and the CIS 18 of the scanner unit 15 in the above-described manner. When signals of both of the image reading devices (the CCD 17 and the CIS 18) are input, inputted image data is DMA-transferred by the memory controller 70 and loaded into the main memory 100.

The ROM 95 stores control program data and appropriate control parameters according to a reading device (CCD or CIS) of the scanner unit 15. The control parameters or the like can be set in accordance with the scanner unit 15. This enables image data input processing according to the data-output format of the CCD 17 or CIS 18, thus eliminating the necessity of a dedicated interface circuit. A MODEM 93 performs conversion between digital data and audio data.

The first bus 83 sends out data, which has been read out of the main memory 100, to respective processing units (10, 20, 30, 40, 50, 60) of the image processing apparatus. The second bus 84 sends out data, which has been read out of the respective processing units of the image processing apparatus, to the main memory 100. The first bus 83 and the second bus 84 perform in pairs image data transmission and reception between the image processing block and the main memory 100.

The third bus 85 mutually connects a CPU 180, the communication and user interface unit 170, a mechatronics controller 125, control registers in the image processing apparatus, and the DMAC 90. The mechatronics controller 125 includes a motor controller 110, and an interruption timer 120 that performs timing control for controlling motor driving timing or synchro-processing of the image processing apparatus.

A display controller (LCDC) 130 performs control for displaying various setting and processing statuses of the image processing apparatus 200 on a display unit 135 of a console unit 136. It also serves to transmit information, which is inputted in the console unit 136 by a system user, to the CPU 180. USB interface units 140 and 150 enable connection with peripherals. A network I/F unit (LANC) 160 performs communication with one or a plurality of network devices, and is connected to a host PC 102 through a wired network (LAN) 101.

A wireless LAN I/F 161 performs communication to an access point 104 through a wireless network 103, and is connected to a host PC 105. The CPU 180 controls overall operation of the image processing apparatus 200 in accordance with a program loaded into the main memory 100.

Figure 2:
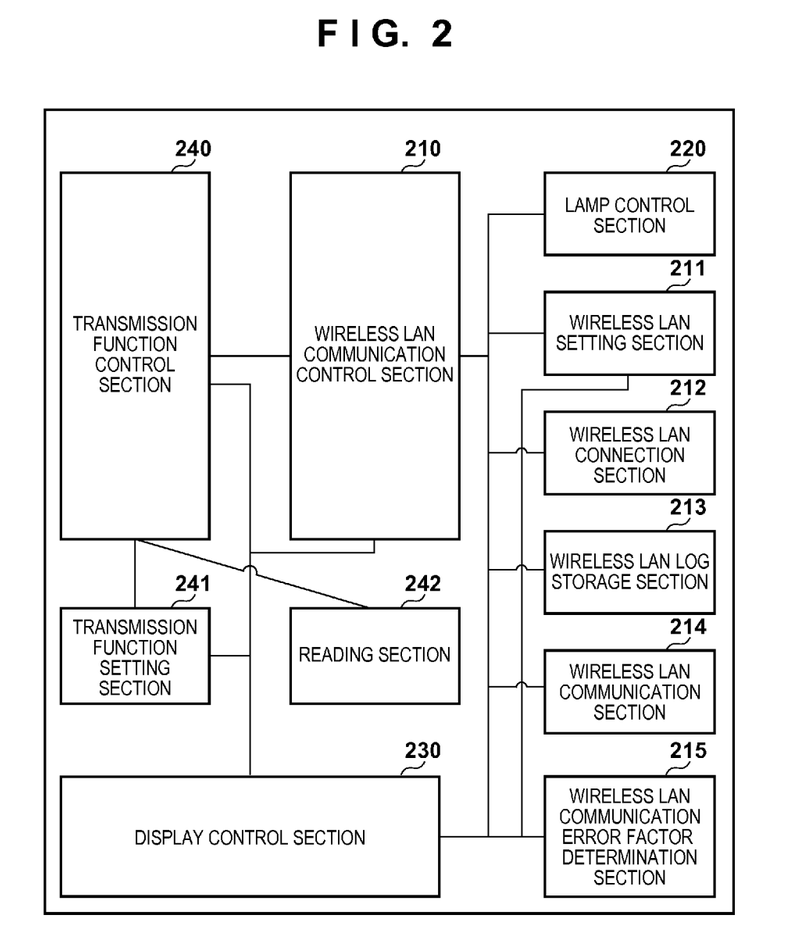
FIG. 2 is a block diagram showing a software configuration concerning a wireless LAN of the image processing apparatus according to the embodiment of the present invention.

FIG. 2 is a block diagram showing a software configuration concerning a wireless LAN of the image processing apparatus 200 according to the embodiment of the present invention.

The software concerning a wireless LAN comprises a wireless LAN communication control section 210, a wireless LAN setting section 211, a wireless LAN connection section 212, a wireless LAN log storage section 213, a wireless LAN communication section 214, and a wireless LAN communication error factor determination section 215. The software further comprises a lamp control section 220, a display control section 230, a transmission function control section 240, a transmission function setting section 241, and a reading section 242. Each of these sections is realized by executing processing by the CPU 180 in accordance with a control program stored in the main memory 100.

The wireless LAN setting section 211 performs setting for realizing wireless connection between the image processing apparatus 200 and the access point 104. The wireless LAN setting section 211 will be described later in detail with reference to FIG. 4.

The wireless LAN connection section 212 realizes wireless connection between the image processing apparatus 200 and the access point 104 in accordance with the setting of the wireless LAN setting section 211. The wireless LAN connection section 212 performs connection processing at regular intervals. If connection has already been established, no processing is performed. If connection has not been established, wireless connection processing is performed. The wireless LAN log storage section 213 stores, in the main memory 100, information indicative of whether the wireless LAN connection section 212 has succeeded in establishing a connection. This information can be referred to by the CPU 180. The wireless LAN communication section 214 performs wireless data transmission and reception through the access point 104. The wireless LAN communication error factor determination section 215 analyzes causes of connection failure when the wireless LAN connection section 212 fails to establish a connection, and determines whether the failure is caused by a setting change in the access point 104. The determination is made by comparing the setting, which has been confirmed by the access point 104 at the time of connection error occurrence, with the setting in the wireless LAN setting section 211.

The setting change in the access point 104 includes the following. For example, a change of an authentication method, a change of an encryption key, a change of ESSID (Extended Service Set Identification) and the like.

When it is found that the connection error is caused by a setting change in the access point 104, it is then determined that the setting needs to be performed again in the wireless LAN setting section 211 of the image processing apparatus 200. The lamp control section 220 controls lighting of a tally light 306 or Wi-Fi light 307 in FIG. 3.

Figure 3:
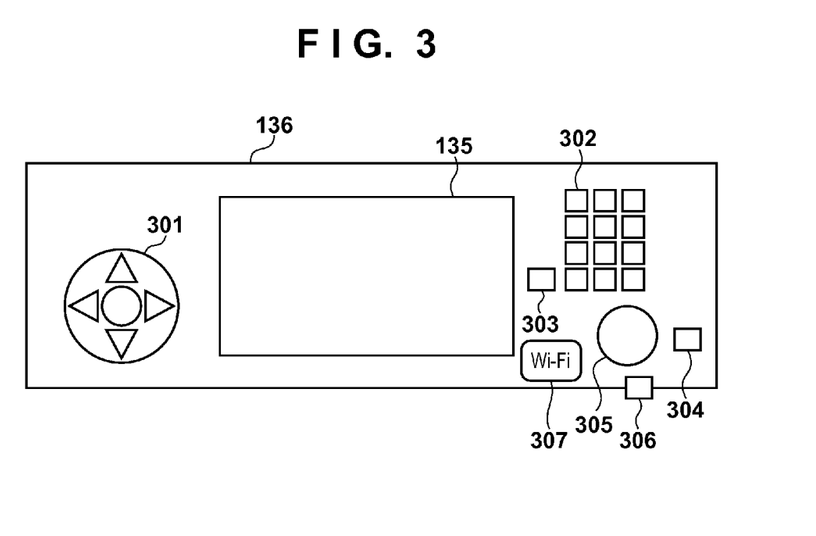
FIG. 3 depicts a top view of a console unit of the image processing apparatus according to the embodiment.

The wireless LAN communication control section 210 performs wireless LAN connection using the wireless LAN setting section 211 and the wireless LAN connection section 212. If the connection fails, it is determined by the wireless LAN communication error factor determination section 215 whether the setting in the wireless LAN setting section 211 of the image processing apparatus 200 needs to be performed again. If the setting needs to be performed again and when an error from a connection state is recognized from the wireless LAN log storage section 213, a message that informs the necessity to reset the settings of the wireless LAN is displayed on the display unit 135 using the display control section 230. Further, with the use of the lamp control section 220, the error occurrence is notified to a user by the tally light 306 (FIG. 3) or Wi-Fi light 307 (FIG. 3). Besides the above-described case, wireless LAN connection processing is repeated using the wireless LAN connection section 212.

The display control section 230 displays UI on the display unit 135 for displaying a message or a status of the image processing apparatus 200. Also, in accordance with user operation on the console unit 136, which will be described later with reference to FIG. 3, image data transmission destination information or the like is inputted. The transmission function setting section 241 enables to set processing in case of an error in data transmission. This will be described later in detail with reference to FIG. 6.

The reading section 242 captures data, which has been read by the scanner unit 15 connected through the scanner I/F unit 10, to supply the data to the control unit 111 of the image processing apparatus 200, and loads the data into the main memory 100. The transmission function control section 240 acquires transmission destination information by the display control section 230, acquires image data by the reading section 242, and transmits the image data by performing wireless LAN communication under the control of the wireless LAN communication control section 210. Further, the number of retries for a transmission job set in the transmission function setting section 241 is compared to the number of error occurrences of the transmission job that is about to be transmitted. If the number of error occurrences exceeds the set number of retries, a transmission error report is outputted and the transmission data is deleted. On the other hand, if the number of error occurrences is equal to or smaller than the set number of retries, and if the wireless LAN communication error factor determination section 215 determines an error, the transmission job is retried. However, if an error is not determined by the wireless LAN communication error factor determination section 215, retry of the transmission job is not performed.

FIG. 3 depicts a top view of the console unit 136 of the image processing apparatus 200 according to the embodiment.

The console unit 136 comprises the display unit 135 that is a touch panel, menu selection keys 301, ten keys 302, a reset key 303, a stop key 304, a start key 305, a tally light 306, and a Wi-Fi light 307. The display unit 135 displays images based on information inputted from the LCDC 130. The menu selection keys 301 include vertical and horizontal scroll keys for selecting a menu displayed on the display unit 135, and an enter key for deciding the selected item. The ten keys 302 are provided for directly inputting a numeral, such as the number of copies. The reset key 303 is provided for clearing a partially set state and returning the settings to initial values. The start key 305 is provided for giving an instruction to start various jobs. The stop key 304 is provided for giving an instruction to stop a started job. The tally light 306 turns off when there is no error, and flashes when an error occurs. The Wi-Fi light 307 turns on or off the light or flashes in accordance with the communication state of the wireless LAN.

Figure 4:
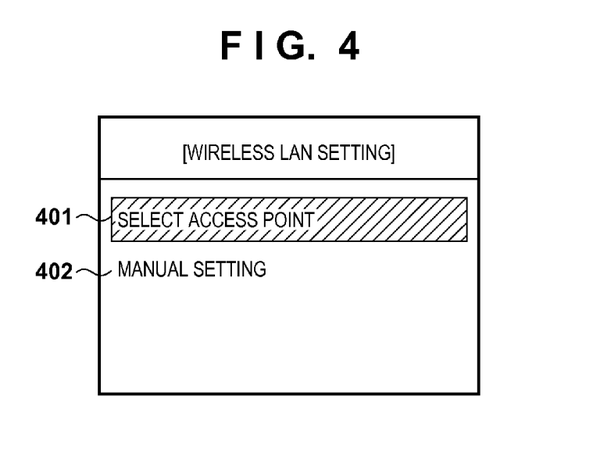
FIG. 4 depicts a view illustrating an example of a wireless LAN setting screen of the image processing apparatus according to the embodiment.

FIG. 4 depicts a view illustrating an example of a wireless LAN setting screen of the image processing apparatus 200 according to the embodiment.

When the image processing apparatus 200 is to be connected to the access point 104, the CPU 180 displays a wireless LAN setting screen shown in FIG. 4 on the display unit 135 of the console unit 136 of the image processing apparatus 200. On the wireless LAN setting screen, a wireless LAN setting method can be selected. In this example, two methods, "select access point" 401 and "manual setting" 402, are displayed. In the method "select access point" 401, a user selects an arbitrary access point to be connected from the search result of surrounding access points. In the method "manual setting" 402, a user inputs setting information of a specific access point to be connected. In FIG. 4, "select access point" 401 is selected.

Figure 5:
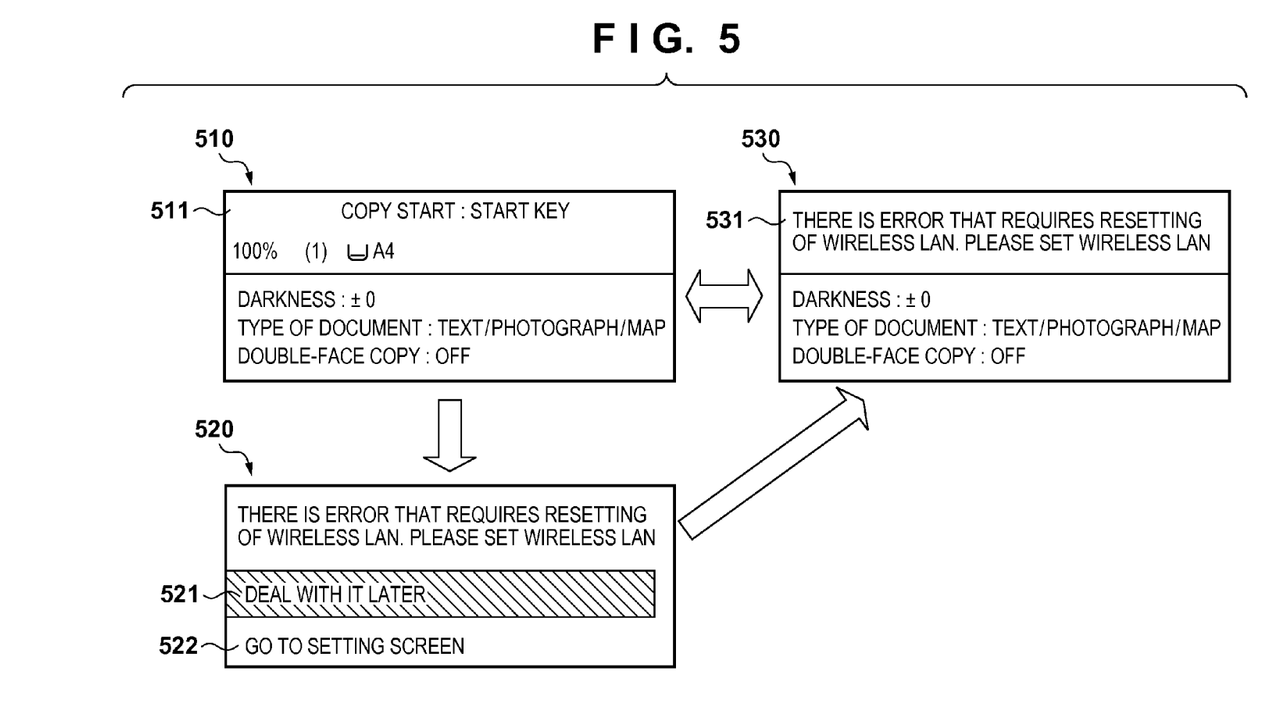
FIG. 5 depicts a view illustrating an example of a display screen showing a wireless LAN connection error of the image processing apparatus according to the embodiment of the present invention.

FIG. 5 depicts a view illustrating an example of a display screen showing a wireless LAN connection error of the image processing apparatus 200 according to the embodiment of the present invention.

A screen 510 shows the state of waiting for a copy job start instruction, which is displayed on the display unit 135 by the CPU 180. A display area 511 is a predetermined area of the copy setting screen that displays part of the copy start setting. A screen 520 exemplifies a screen displayed on the display unit 135 when the CPU 180 recognizes a wireless LAN error that requires resetting of the wireless LAN. Displayed herein is a message "There is an error that requires resetting of the wireless LAN. Please set the wireless LAN." Also, selection options "Deal with it later" 521 and "Go to setting screen" 522 are displayed. If "Deal with it later" 521 is selected, a screen 530 is displayed. If "Go to setting screen" 522 is selected, a wireless LAN setting screen is displayed.

The screen 530 is displayed on the display unit 135 when the CPU 180 recognizes a wireless LAN error that requires resetting. In the display area 511 of the copy setting screen of the screen 510, a message 531 "There is an error that requires resetting of the wireless LAN. Please set the wireless LAN" is displayed for a predetermined period. After the message is displayed for the predetermined period, the screen 510 (the predetermined display area 511 of the copy setting screen changes to the screen 510 in FIG. 5) is displayed again (switching the display of the display area 511 in the above-described manner will be referred to as toggle display). When no error occurrence is recognized, displaying of the screen 530 is not performed.

As described above, according to the present embodiment, even when the option "Deal with it later" 521 is selected in the screen 520, a message for requesting to reset the wireless LAN is displayed on the screen 530. Accordingly, it is possible to reliably notify the user of the necessity to reset the wireless LAN. By virtue of this feature, in a case of error occurrence that requires resetting of the wireless LAN, it is possible to eliminate pointless transmission retries, which are performed because a user does not reset the wireless LAN despite the error occurrence.

Figure 6:
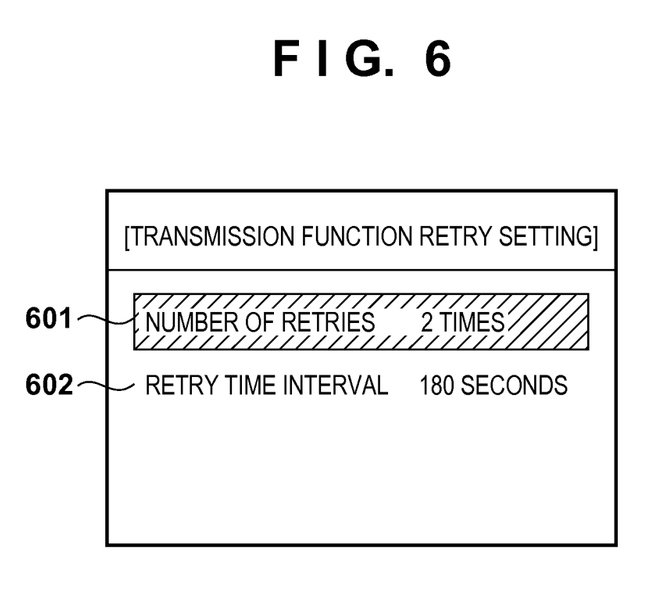
FIG. 6 depicts a view illustrating an example of a retry-processing setting screen of a transmission function in the image processing apparatus according to the embodiment.

FIG. 6 depicts a view illustrating an example of a retry-processing setting screen of the transmission function in the image processing apparatus 200 according to the embodiment.

A setting field 601 shows the number of retries for one same transmission job, which is displayed by the CPU 180. A user is able to set the number of transmission retries for a case of transmission error occurrence. If an error cannot be overcome after transmission is retried for the set number of times (twice in FIG. 6), the CPU 180 erases the transmission data and deletes the transmission job. A setting field 602 shows the retry time interval, displayed by the CPU 180. By virtue of this, a user is able to set an arbitrary time interval of transmission retry for a case of transmission error occurrence. In FIG. 6, the time interval is set to 180 seconds.

Figure 7:
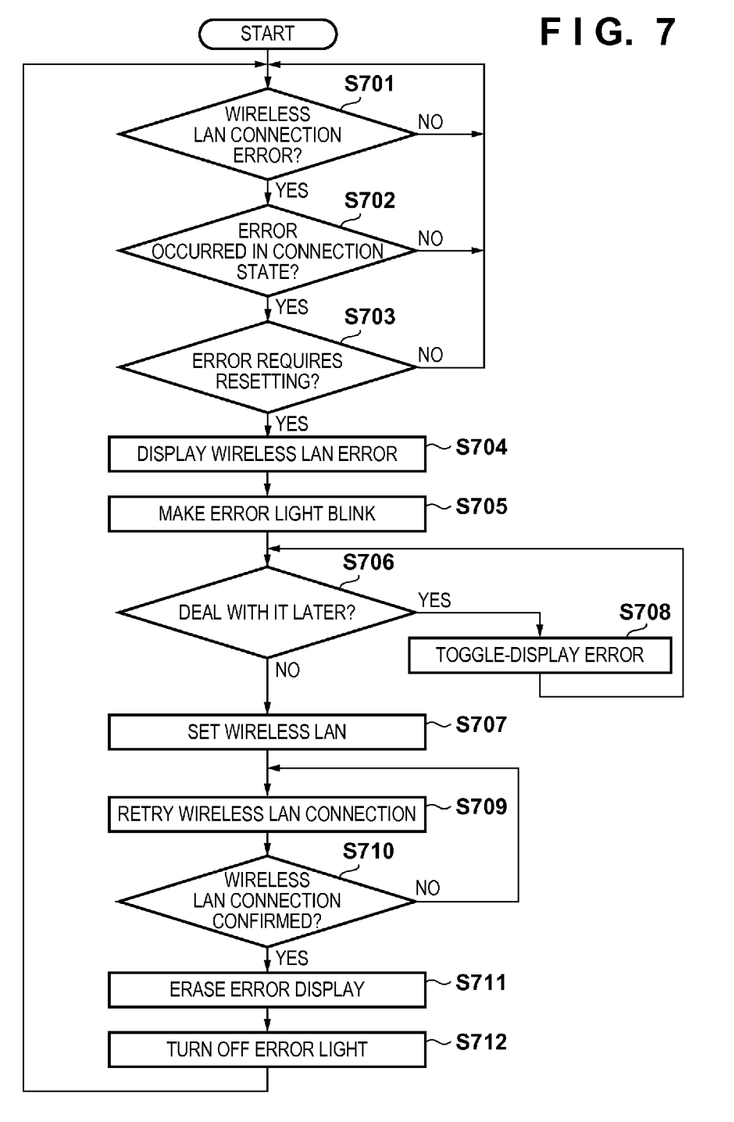
FIG. 7 is a flowchart for describing processing executed when a wireless LAN error occurs in the image processing apparatus according to the embodiment of the present invention.

FIG. 7 is a flowchart for describing processing executed when a wireless LAN error occurs in the image processing apparatus 200 according to the embodiment of the present invention. The program that realizes this processing is stored in the main memory 100 at the time of execution, and is executed under the control of the CPU 180.

In step S701, the CPU 180 performs wireless connection between the image processing apparatus 200 and the access point 104 using the wireless LAN connection section 212 under the control of the wireless LAN communication control section 210. When a wireless connection error occurs, the CPU 180 determines in step S702 whether the wireless LAN connection error has occurred in the wireless LAN connection state, based on the wireless LAN log storage section 213. If the connection error is caused because a wireless LAN connection state changes to a non-connection state, the processing goes to step S703. Meanwhile, if a wireless LAN connection state has not been established from the beginning, the processing returns to step S701.

In step S703, the CPU 180 determines, by the wireless LAN communication error factor determination section 215, whether wireless LAN setting needs to be performed again by the wireless LAN setting section 211 of the image processing apparatus 200. If it is determined that resetting is necessary, the processing goes to step S704. If it is determined that resetting is not necessary, the processing returns to step S701.

In step S704, the CPU 180 displays the screen 520 shown in FIG. 5 on the display unit 135 to display a message for notifying error occurrence and requesting a user to perform setting of the wireless LAN, and furthermore, displays selection options "Deal with it later" or "Go to setting screen." Thereafter, the processing goes to step S705. In step S705, the CPU 180 makes the tally light 306 or Wi-Fi light 307 blink for notifying error occurrence, using the lamp control section 220. In parallel with this processing, the CPU 180 determines in step S706 whether "Deal with it later" 521 has been selected by a user on the screen 520 of FIG. 5 displayed on the display unit 135 in step S704. If "Deal with it later" 521 has been selected, the processing goes to step S708, whereas if "Go to setting screen" 522 has been selected, processing of step S707 is performed. In step S707, the CPU 180 displays the wireless LAN setting screen using the wireless LAN setting section 211 for enabling the user to set the wireless LAN. When wireless LAN setting is completed, the processing goes to step S709.

Meanwhile, in step S708, the CPU 180 erases the screen 520 of FIG. 5, and displays the screen 530 of FIG. 5 to alternately perform displaying the message 531 and displaying the screen 510 (toggle display). In this manner, the user is instructed to perform resetting of the wireless LAN, and steps S706 to S708 are executed until wireless LAN resetting is performed by the wireless LAN setting section 211. When "Go to setting screen" is selected in step S706 and wireless LAN setting is performed in step S707, the processing goes to step S709. In the above-described manner, because retry execution is prohibited until wireless LAN resetting is performed, pointless connection retries can be prevented.

In step S709, the CPU 180 tries wireless connection between the image processing apparatus 200 and the access point 104, using the wireless LAN connection section 212, in accordance with the setting of the wireless LAN setting section 211. In step S710, the CPU 180 determines, as a result of wireless LAN connection retry in step S709, whether wireless LAN connection has succeeded between the image processing apparatus 200 and the access point 104. If the wireless LAN connection succeeds, the processing goes to step S711, whereas if it fails, the processing goes to step S709 for retry processing. In parallel with steps S709 and S710, wireless LAN setting can be performed by the wireless LAN connection section 212.

When wireless LAN connection succeeds in the above-described manner, the processing goes to step S711, and the CPU 180 erases the error message and the message for requesting to reset the wireless LAN, which have been displayed in step S708, and the processing goes to step S712. In step S712, the CPU 180 stops the flashing processing of the lights 306 and 307 that notifies error occurrence and turns off the lights by the lamp control section 220, and the processing goes to step S701.

As has been described above, according to the present embodiment, for instance, even when a connection error is caused by changes in the setting of a wireless LAN access point, a message for requesting a user to reset the wireless LAN can be displayed. By virtue of this feature, the user can immediately deal with the connection error, and therefore, it is possible to reduce the function-disabled time period, during which the function realized through the wireless LAN is unavailable because of the connection error. Furthermore, it is possible to prevent repetition of pointless transmission retries performed despite occurrence of a connection error that requires resetting of the wireless LAN.

Figure 8A:
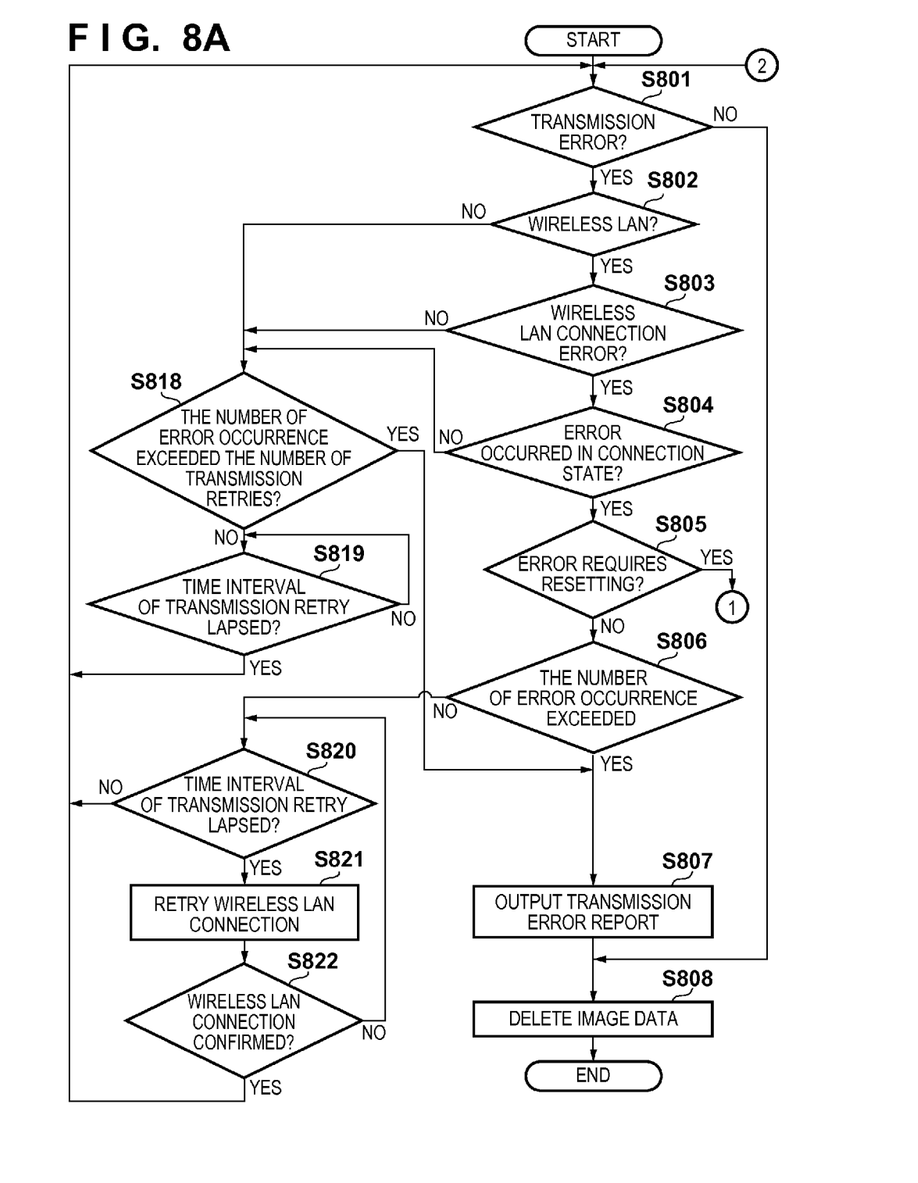
FIGS. 8A and 8B are flowcharts for describing processing executed when a transmission error occurs in the image processing apparatus according to the embodiment of the present invention.
Figure 8B:
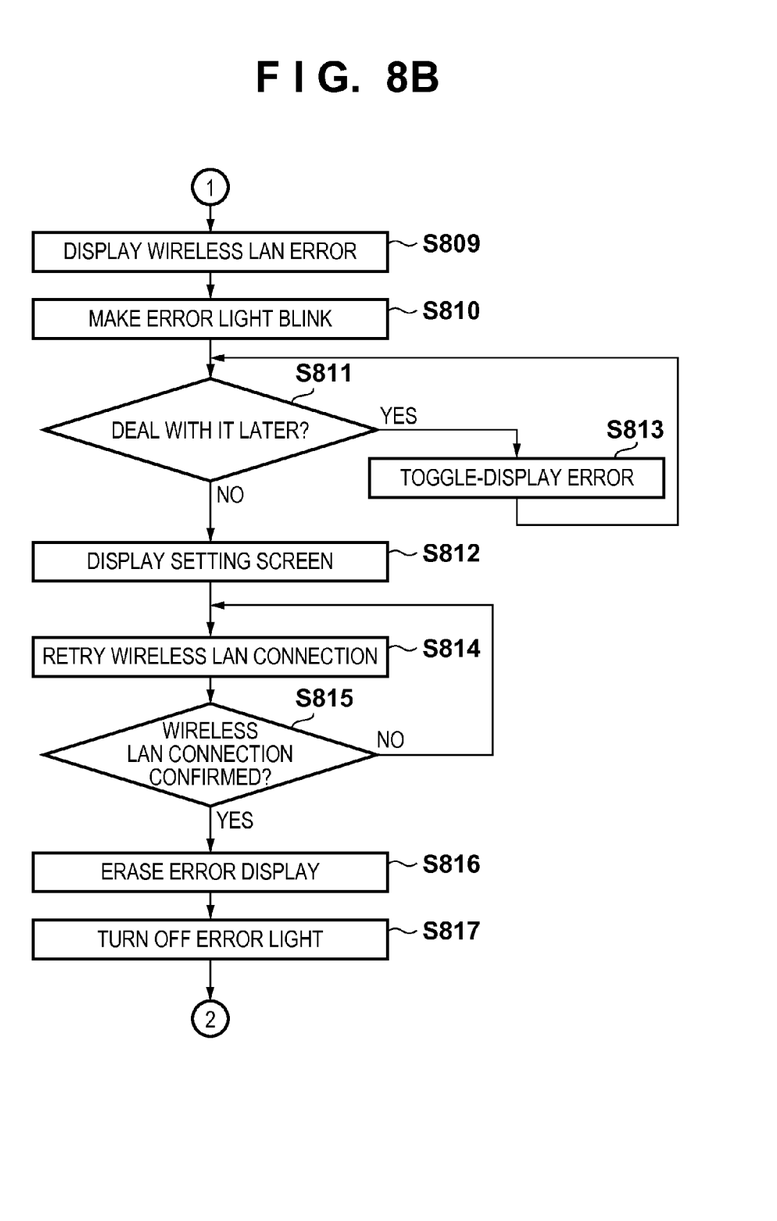

FIGS. 8A and 8B are flowcharts for describing processing executed when a transmission error occurs in the image processing apparatus 200 according to the embodiment of the present invention. The program that realizes this processing is stored in the main memory 100 at the time of execution, and is executed under the control of the CPU 180.

In step S801, the CPU 180 acquires transmission destination information from the display control section 230 using the transmission function control section 240, and acquires image data by the reading section 242. The image data is transferred through the wireless LAN by the wireless LAN communication control section 210. When a transmission error occurs in this stage, processing in step S802 is performed. If no error occurs, the process proceeds to step S808. In step S802, the CPU 180 determines whether the transmission error in step S801 has occurred in the wireless LAN connection or in the wired LAN connection. In a case of an error in the wireless LAN connection, the processing goes to step S803. In a case of an error in the wired LAN connection, the processing goes to step S818.

In step S803, the CPU 180 performs wireless connection between the image processing apparatus 200 and the access point 104 by the wireless LAN connection section 212 under the control of the wireless LAN communication control section 210. When the connection fails, the processing goes to step S804, but when the wireless LAN connection succeeds, processing in step S818 is performed.

In step S804, the CPU 180 determines whether the connection error has occurred in the wireless LAN connection state, based on the wireless LAN log storage section 213. If the connection error has occurred in the wireless LAN connection state, the processing goes to step S805, whereas if the connection error has not occurred in the connection state, the processing goes to step S818. In step S805, the CPU 180 determines, by the wireless LAN communication error factor determination section 215, whether wireless LAN setting needs to be performed again by the wireless LAN setting section 211. If it is determined that resetting is necessary, the processing goes to step S809. If it is determined that resetting of the wireless LAN is not necessary, the processing goes to step S806. In step S806, the CPU 180 compares, by the transmission function control section 240, the number of retries for one same transmission job, which is set in the field 601 in FIG. 6, to the number of error occurrence of the transmission job that is about to be transmitted. If the number of error occurrence exceeds the set number of retries, the processing goes to step S807, otherwise processing in step S820 is performed. In step S807, the CPU 180 outputs an error report using the transmission function control section 240, and proceeds to step S808. In step S808, the CPU 180 deletes the error transmission job using the transmission function control section 240, and ends the processing.

Meanwhile, if the error requires resetting in step S805, the processing goes to step S809. The CPU 180 displays a message for notifying error occurrence and requesting a user to reset the wireless LAN, as well as selection options "Deal with it later" or "Go to setting screen" on the display unit 135, as exemplified by screen 520 in FIG. 5. In step S810, the CPU 180 makes the tally light 306 or Wi-Fi light 307 blink for notifying error occurrence, using the lamp control section 220. In parallel with this processing, processing in step S811 is performed. In step S811, if the CPU 180 determines that a user has selected "Deal with it later" 521 on the screen 520 displayed on the display unit 135 in step S809, processing in step S813 is performed. Meanwhile, if the CPU 180 determines that the user has selected "Go to setting screen" 522, processing in step S812 is performed. In step S812, the CPU 180 displays the wireless LAN setting screen using the wireless LAN setting section 211 for enabling the user to set the wireless LAN. When wireless LAN setting is completed, the processing goes to step S814. Meanwhile, in step S813, the CPU 180 erases the display of the screen 520, and displays the screen 510 that is displayed prior to the screen 520. Then, processing (toggle display) is performed for displaying or not displaying a message for a predetermined period of time, which notifies an error and requests resetting of the wireless LAN in the position of the message 531 in FIG. 5. Then, the processing goes to step S811.

In step S814, the CPU 180 tries wireless connection between the image processing apparatus 200 and the access point 104, using the wireless LAN connection section 212, in accordance with the setting of the wireless LAN setting section 211, and then processing in step S815 is performed. In step S815, the CPU 180 determines, as a result of wireless LAN connection retry in step S814, whether wireless LAN connection has succeeded between the image processing apparatus 200 and the access point 104. If the wireless LAN connection fails, the processing goes to step S814, whereas if it succeeds, the processing goes to step S816. Note that, in parallel with steps S814 and S815, wireless LAN setting can be performed by the wireless LAN connection section 212.

In step S816, the CPU 180 erases the error message and the message for requesting to reset the wireless LAN, which are displayed in step S813, and the processing goes to step S817. In step S817, the CPU 180 stops the flashing processing that notifies error occurrence and turns off the lights by the lamp control section 220, and the processing goes to step S801. Note that processing of steps S805 and S809 to S817 are the same as the processing of steps S703 and S704 to S712 in FIG. 7.

Meanwhile, if the determination in steps S802, S803, and S804 is NO, the processing goes to step S818. In step S818, the CPU 180 compares, by the transmission function control section 240, the number of retries for one same transmission job, which is set in the field "number of retries" 601 in FIG. 6, to the number of error occurrences of the transmission job that is about to be transmitted. If the number of error occurrences exceeds the set number of retries, the processing goes to step S807, whereas if the number of error occurrences is equal to or smaller than the set number of retries, the processing goes to step S819. In step S819, the CPU 180 determines, by the transmission function control section 240, whether the retry time interval set in the "retry time interval setting" field 602 in FIG. 6 has lapsed from the occurrence of the transmission error. If the time has lapsed, the processing goes to step S801, but if the time has not lapsed, processing in step S819 is performed.

In step S805, if the error does not require wireless LAN resetting, the processing goes to step S806, and if the number of error occurrences does not exceed the set number of retries, the processing goes to step S820. In step S820, the CPU 180 determines, by the transmission function control section 240, whether the retry time interval set in the "retry time interval setting" field 602 in FIG. 6 has lapsed from the occurrence of the transmission error. If it is determined that the time has lapsed, the processing goes to step S821, whereas if it is determined that the time has not lapsed, processing in step S801 is performed. In step S821, the CPU 180 tries wireless connection between the image processing apparatus 200 and the access point 104, using the wireless LAN connection section 212, in accordance with the setting of the wireless LAN setting section 211, and then the processing goes to step S822. In step S822, if the CPU 180 determines that wireless LAN connection has succeeded between the image processing apparatus 200 and the access point 104 as a result of wireless LAN connection retry in step S821, then the CPU 180 goes to the image data transmission processing in step S801. On the other hand, if the wireless LAN connection fails, the processing goes to step S820. In parallel with steps S821 and S822, wireless LAN setting can be performed by the wireless LAN connection section 212. Note that the lapsing of time in steps S819 and S820 is timed by the timer 120.

As has been described above, according to the present embodiment, for instance, even when an error is caused by changes in the setting of a wireless LAN access point, it is possible to alert the user to change the wireless LAN setting. By virtue of this feature, the apparatus can quickly recover from an error state in a case of a wireless connection error, and therefore, it is possible to reduce the function-disabled time period, during which the function realized by transmission/reception through the wireless LAN is unavailable.

Furthermore, in the transmission function, in a case where a connection error continues unless wireless LAN setting is changed, transmission retries are not performed. Therefore, it is possible to prevent transmission data from being discarded when the number of transmission retries reaches a default value. Further, because the transmission retries are performed in a state in which the wireless LAN connection has been established, usability improves.

In addition, in a case of a transmission error caused by a worsened wireless LAN communication state, while waiting for the time-out, retries are performed after wireless LAN connection is established. Therefore, there are better possibilities of successful transmission by retries.

As set forth above, according to the present embodiment, even in a case where setting of a wireless LAN access point is changed, it is possible to make a user aware of the change, and it is possible to reduce the function-disabled time period, during which the function realized by transmission/reception through the wireless LAN is unavailable. Further, in a case where the transmission function cannot be recovered from a connection error unless a wireless LAN setting is changed, transmission retries are not performed. Therefore, it is possible to eliminate pointless transmission retries, and prevent transmission data from being discarded when transmission retries fail. As described above, in a case of connection error occurrence, because transmission retries are performed after a wireless LAN connection is confirmed, usability improves. Furthermore, in a case of a transmission error in the transmission function caused by a worsened wireless LAN communication state, a transmission retry is performed only when the wireless LAN connection is reestablished before the time-out is reached. Therefore, it achieves an effect of better possibilities of successful transmission by retries.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-009427, filed Jan. 19, 2012, which is hereby incorporated by reference herein in its entirety.

What is claimed is:

1. An image processing apparatus capable of wireless communication to an access point, comprising:
an image transmission unit configured to execute a transmission process for transmitting image data via the wireless communication, the image transmission unit being configured to, in a case where an error is occurred at the transmission process, retry the transmission process for a set number of times;
an error output unit configured to output error information in a case where the retry or the transmission process does not succeed:
a determination unit configured to determine whether a setting of the access point has been changed; and
a control unit configured to, in a case where the error is occurred at the transmission process and in a case where the determination unit determines that the setting of the access point has been changed, restrict the image transmission unit to retry the transmission process.

2. The image processing apparatus according to claim 1, further comprising a wireless connection unit configured to, in a case where the determination unit determines that the setting of the access point has been changed, start connection to the access point after resetting of the wireless communication is performed by the user,
wherein in a case where the determination unit determines that the setting of the access point has not been changed, the wireless connection unit starts connection to the access point without waiting for the user to perform resetting of the wireless communication.

3. The image processing apparatus according to claim 1, further comprising a display control unit configured to, in a case where the determination unit determines that the setting of the access point has been changed, display a message for requesting to perform resetting until resetting of the wireless communication is performed by the user.

4. The image processing apparatus according to claim 1, wherein the error occurs when a wireless connection state with the access point becomes an unconnected state.

5. The image processing apparatus according to claim 1, further comprising a control unit configured to, in a case where the determination unit determines that the setting of the access point has not been changed and in a case where the error is caused at the time of transmission, perform control to execute a transmission retry for a set number of times, and if the transmission retry succeeds, shift to image data transmission processing by a wireless LAN, whereas if the transmission retry does not succeed after the set number of times of transmission retries, delete the image data.

6. A control method for controlling an image processing apparatus capable of wireless communication to an access point, comprising:
executing a transmission process for transmitting image data via the wireless communication, and retrying the transmission process for a set number of times in a case where an error is occurred at the transmission process;
outputting error information in a case where the retrying or the transmission process does not succeed;
determining whether a setting of the access point has been changed; and
in a case where the error is occurred at the transmission process and in a case where the determining determined that the setting of the access point has been changed, restricting retrying of the transmission process.

7. The control method according to claim 6, further comprising the step of, in a case where the determining determined that the setting of the access point has been changed, displaying a message for requesting to perform resetting until resetting of a wireless LAN is performed by the user.

8. The control method according to claim 6, wherein the error occurs when a wireless connection state with the access point becomes an unconnected state.

9. The control method according to claim 6, further comprising a step of, in a case where the determining determined that the setting of the access point has not been changed and in a case where the error is caused at the time of transmission, controlling to execute a transmission retry for a set number of times, and if the transmission retry succeeds, shifting to image data transmission processing by a wireless LAN, whereas if the transmission retry does not succeed after the set number of times of transmission retries, deleting the image data.

* * * * *